(12) United States Patent
Iwatani et al.

(10) Patent No.: US 12,384,554 B2
(45) Date of Patent: Aug. 12, 2025

(54) ELECTRIC FAN AND ELECTRIC AIRCRAFT

(71) Applicant: MITSUBISHI HEAVY INDUSTRIES, LTD., Tokyo (JP)

(72) Inventors: Junji Iwatani, Tokyo (JP); Takehiko Imai, Tokyo (JP); Yasutaka Aoki, Tokyo (JP); Masayuki Sakai, Tokyo (JP); Naotaka Uchimichi, Tokyo (JP); Tsuyoshi Kitamura, Tokyo (JP); Akihiro Nakaniwa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/712,172

(22) PCT Filed: Nov. 18, 2022

(86) PCT No.: PCT/JP2022/042817
§ 371 (c)(1),
(2) Date: May 21, 2024

(87) PCT Pub. No.: WO2023/181490
PCT Pub. Date: Sep. 28, 2023

(65) Prior Publication Data
US 2025/0019083 A1  Jan. 16, 2025

(30) Foreign Application Priority Data
Mar. 25, 2022  (JP) .................................. 2022-049807

(51) Int. Cl.
*B64D 27/34* (2024.01)
*B64D 27/32* (2024.01)
(Continued)

(52) U.S. Cl.
CPC ............. *B64D 27/34* (2024.01); *B64D 27/32* (2024.01); *B64D 33/04* (2013.01); *B64D 33/08* (2013.01)

(58) Field of Classification Search
CPC ........ B64D 27/34; B64D 27/32; B64D 33/04; B64D 33/08
See application file for complete search history.

(56) References Cited

U.S. PATENT DOCUMENTS

2009/0272854 A1  11/2009  Violett
2017/0070125 A1  3/2017  Bei et al.
(Continued)

FOREIGN PATENT DOCUMENTS

JP  2018-509332 A  4/2018
JP  2021-20634 A   2/2021
(Continued)

OTHER PUBLICATIONS

International Search Report for International Application No. PCT/JP2022/042817, dated Dec. 20, 2022, with English translation.
(Continued)

*Primary Examiner* — Rodney A Bonnette
(74) *Attorney, Agent, or Firm* — Birch, Stewart, Kolasch & Birch, LLP

(57) ABSTRACT

An electric fan includes: an electric motor that includes an output shaft extending along an axis line and a tubular housing centered on the axis line; an inner duct provided on a downstream side of the electric motor; a plurality of blades mounted on the output shaft; and a cooling member having a plurality of fins provided on an outer peripheral surface of the housing.

9 Claims, 7 Drawing Sheets

(51) Int. Cl.
  *B64D 33/04* (2006.01)
  *B64D 33/08* (2006.01)

(56) References Cited

U.S. PATENT DOCUMENTS

| | | |
|---|---|---|
| 2022/0418171 A1 | 12/2022 | Fukushima et al. |
| 2023/0192310 A1* | 6/2023 | Fukazu .................. B64D 33/08 244/53 R |
| 2024/0213855 A1* | 6/2024 | Sugita .................... B64D 33/08 |

FOREIGN PATENT DOCUMENTS

| | | |
|---|---|---|
| JP | 2021-195883 A | 12/2021 |
| WO | WO 2021/172102 A1 | 9/2021 |

OTHER PUBLICATIONS

Written Opinion of the International Searching Authority for International Application No. PCT/JP2022/042817, dated Dec. 20, 2022, with English translation.

* cited by examiner

ELECTRIC FAN AND ELECTRIC AIRCRAFT

TECHNICAL FIELD

The present disclosure relates to an electric fan and an electric aircraft.

Priority is claimed on Japanese Patent Application No. 2022-049807, filed Mar. 25, 2022, the content of which is incorporated herein by reference.

BACKGROUND ART

In recent years, research and development of an electric aircraft that obtains a propulsion force by an electric fan have been actively carried out. The electric fan mainly includes an electric motor, a plurality of blades that are rotationally driven by the electric motor, and a cooling device for cooling the electric motor. For example, Patent Document 1 discloses, as an example of a cooling device, a so-called liquid cooling mechanism using a cooling medium.

CITATION LIST

Patent Document

[Patent Document 1]:
PCT International Publication No. WO2021/172102

SUMMARY OF INVENTION

Technical Problem

However, in a case where the liquid cooling medium is used as described above, a sealing device for preventing leakage from each part, a large heat exchanger for performing heat exchange between the cooling medium and the outside air, or the like is required. Therefore, the complexity of a device and an increase in cost are caused.

The present disclosure has been made in order to solve the above-described problems, and an object of the present disclosure is to provide an electric fan and an electric aircraft, which have a simpler structure and have higher cooling performance.

Solution to Problem

In order to solve the above-described problems, an electric fan according to the present disclosure includes: an electric motor that includes an output shaft extending along an axis line and a tubular housing centered on the axis line; an inner duct provided on a downstream side of the electric motor; a plurality of blades mounted on the output shaft; and a cooling member having a plurality of fins that are provided on an outer peripheral surface of the housing and exposed to an outside of the inner duct.

An electric aircraft according to the present disclosure includes: the electric fan described above; and a fuselage on which the electric fan is mounted.

Advantageous Effects of Invention

According to the present disclosure, it is possible to provide an electric fan and an electric aircraft, which have a simpler structure and have higher cooling performance.

DESCRIPTION OF EMBODIMENTS

First Embodiment

Hereinafter, an electric aircraft 1 and an electric fan 20 according to a first embodiment of the present disclosure will be described with reference to FIGS. 1 to 4.
(Configuration of Electric Aircraft)

Figure 1:
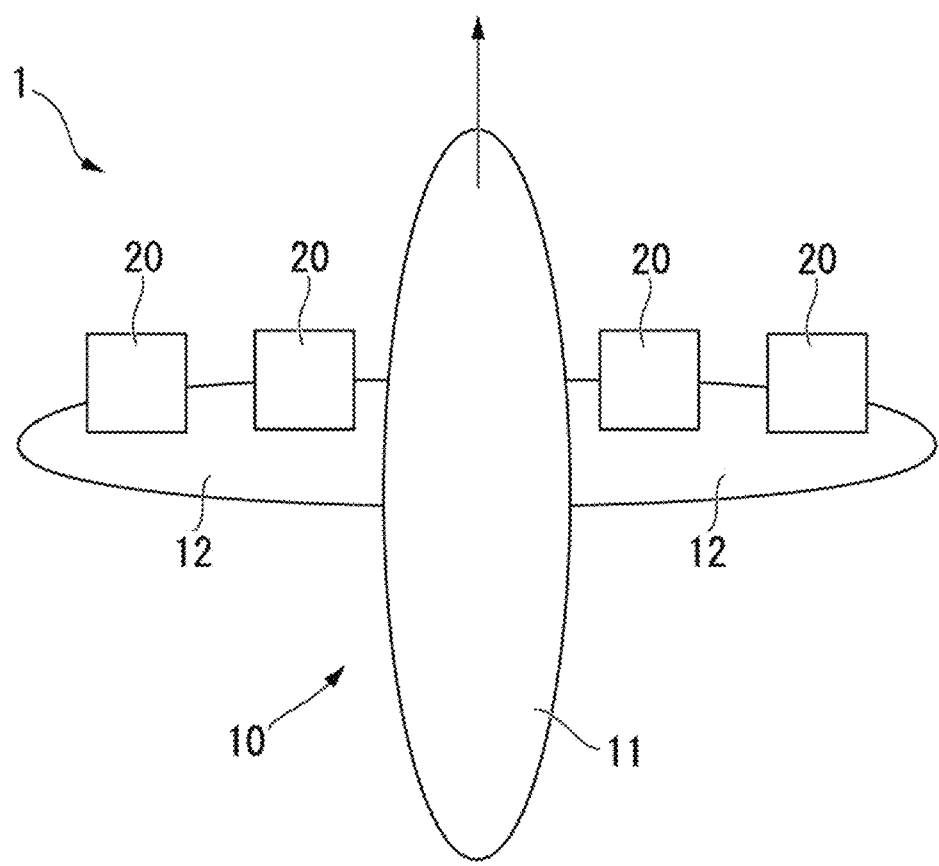
FIG. 1 is a schematic plan view showing the configuration of an electric aircraft according to a first embodiment of the present disclosure.

As shown in FIG. 1, the electric aircraft 1 includes a fuselage 10 and a plurality of electric fans 20. The fuselage 10 includes a fuselage main body 11 and a plurality of wings 12. As an example, the fuselage main body 11 has a streamlined shape extending in a traveling direction, and a space for accommodating an operator or freight and passengers is formed inside the fuselage main body 11. In addition, a landing leg (not shown) is mounted on a lower part of the fuselage main body 11.

One or more wings 12 are provided on each of both sides in a width direction of the fuselage main body 11. The wing 12 has an airfoil-shaped cross-sectional shape in order to generate a lift when the electric aircraft 1 performs horizontal flight. Further, in the present embodiment, as an example, a plurality of (two) electric fans 20 are provided at each wing 12. The electric fan 20 may be provided on the fuselage main body 11 instead of the wing 12. The electric fan 20 is supported in a state in which a thrust force direction thereof can be changed. That is, the thrust force direction is set to be vertically downward during the vertical takeoff and landing. On the other hand, in a case of horizontal flight, the thrust force direction can be set to be the horizontal direction.

(Configuration of Electric Fan)

Figure 2:
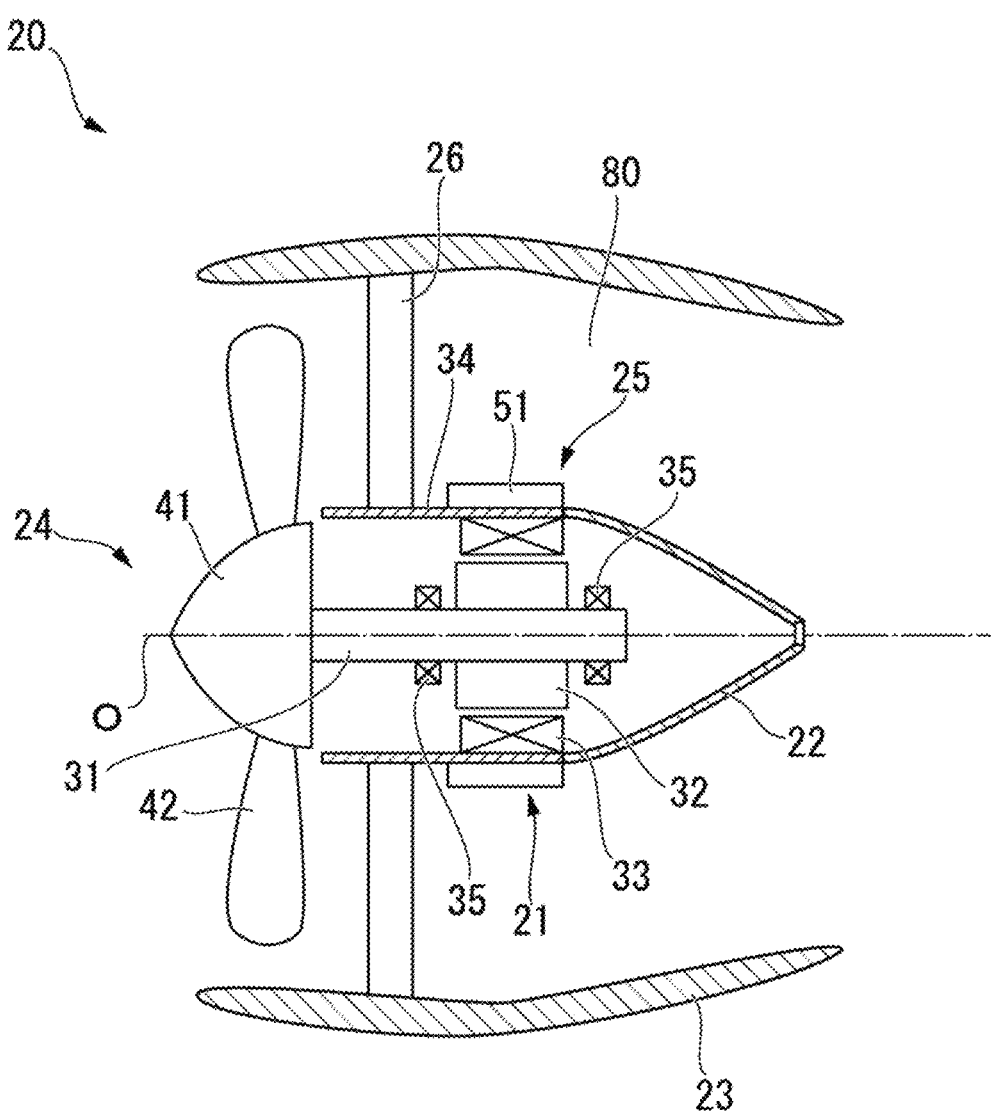
FIG. 2 is a cross-sectional view showing the configuration of an electric fan according to the first embodiment of the present disclosure.

Next, a detailed configuration of the electric fan 20 will be described. As shown in FIG. 2, the electric fan 20 includes an electric motor 21, an inner duct 22, an outer duct 23, a propeller 24, and a cooling member 25.

The electric motor 21 includes an output shaft 31, a rotor core 32, a stator core 33, a housing 34, and a bearing device 35. The output shaft 31 has a columnar shape extending along an axis line O. The output shaft 31 is supported by the bearing device 35 at a middle position in an extension direction in a state of being rotatable around the axis line O. Specifically, as the bearing device 35, each of a journal bearing that supports a load in the radial direction and a thrust bearing that supports a load in the direction of the axis line O is appropriately used.

The rotor core 32 is provided on an outer peripheral surface of the output shaft 31. The rotor core 32 has a plurality of permanent magnets. The rotor core 32 is covered by the stator core 33 with a gap therebetween from an outer peripheral side. The stator core 33 has a plurality of coils. By supplying the coil with an electric current, an electromagnetic force is generated between the coil and the permanent magnet, and rotation energy is given to the rotor core 32 and the output shaft 31. That is, the output shaft 31 is rotationally driven around the axis line O.

The stator core 33 is covered from the outer peripheral side by the housing 34. The housing 34 has a cylindrical shape centered on the axis line O. As an example, the stator core 33 is fixed in a state of being tightly fitted to the inner peripheral surface of the housing 34 by shrink fitting or the like.

The inner duct 22 is provided on a second side of the electric motor 21 in the direction of the axis line O. It should be noted that, in the following description, the side on which the inner duct 22 is located as viewed from the electric motor 21 is referred to as a "downstream side", and the side opposite to the downstream side in the direction of the axis line O is referred to as an "upstream side". The inner duct 22 has a circular cross-sectional shape centered on the axis line O. The inner duct 22 is gradually reduced in diameter from the upstream side toward the downstream side. A space is formed inside the inner duct 22.

The electric motor 21 and the inner duct 22 are covered from the outer peripheral side by the outer duct 23. The outer duct 23 is supported from a radial inner side by a plurality of struts 26 that protrude from an outer peripheral surface of the housing 34 of the electric motor 21, as an example. A plurality of struts 26 are arranged at intervals in the circumferential direction. An air flow path 80 is formed between the outer duct 23 and the inner duct 22.

The propeller 24 is mounted on a first side (upstream side) in the direction of the axis line O of the output shaft 31 of the electric motor 21. The propeller 24 includes a spinner 41 and a plurality of blades 42. The spinner 41 is fixed to an end portion on the upstream side of the output shaft 31. The spinner 41 has a pointed shape that is convex toward the upstream side. The spinner 41 has a circular shape when viewed in the direction of the axis line O. The plurality of blades 42 arranged at equal intervals in the circumferential direction are provided on the outer peripheral surface of the spinner 41.

Each blade 42 extends from the outer peripheral surface of the spinner 41 toward the radial outer side. Each blade 42 has an airfoil-shaped cross-sectional shape when viewed in the radial direction. In addition, each blade 42 is fixed to the spinner 41 in a state of being twisted around a central axis extending in the radial direction (a pitch is added). Therefore, when the blade 42 rotates with the rotation of the output shaft 31, air is pressure-fed from the upstream side toward the downstream side. A thrust is generated by discharging the air flow from the air flow path 80 described above toward the downstream side.

(Configuration of Cooling Member)

Figure 3:
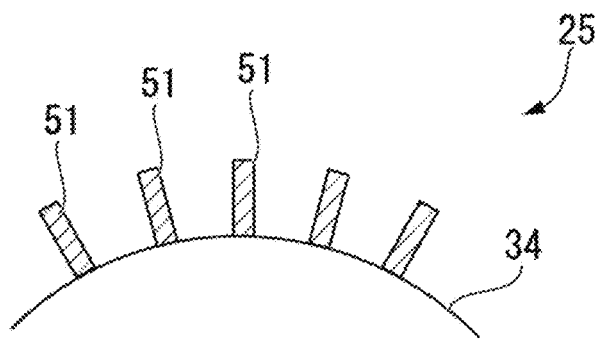
FIG. 3 is a cross-sectional view of a cooling member according to the first embodiment of the present disclosure as viewed in a direction of an axis line.
Figure 4:
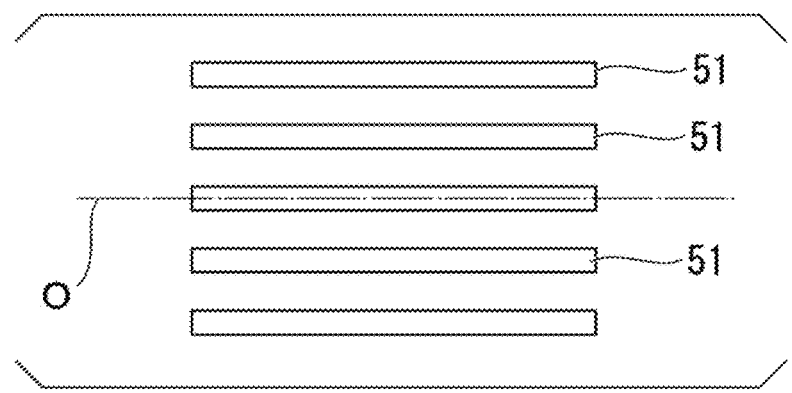
FIG. 4 is a diagram showing the cooling member according to the first embodiment of the present disclosure as viewed from a radial outer side.

The cooling member 25 is provided at the electric motor 21. The cooling member 25 includes a plurality of fins 51. As shown in FIG. 3, the fins 51 protrude from the outer peripheral surface of the housing 34 of the electric motor 21 toward the radial outer side. A cross-sectional shape of each fin 51 as viewed from the direction of the axis line O is a rectangular shape. The plurality of fins 51 are arranged at equal intervals in the circumferential direction. The radial dimensions of the plurality of fins 51 are the same as each other. In addition, as shown in FIG. 4, each fin 51 extends parallel to the direction of the axis line O.

(Operation and Effect)

In recent years, research and development of the electric aircraft 1 that obtains a propulsion force by the electric fan 20 have been actively carried out. When the electric motor 21 is rotationally driven, heat is generated in association with an internal resistance of the electric motor 21. In a case where the heat is intensified, a normal operation of the electric motor 21 is hindered. Therefore, in the electric fan 20 in the related art, a so-called liquid cooling mechanism using a cooling medium has been generally used as a cooling mechanism of the electric motor 21.

However, as described above, in a case where the liquid cooling medium is used, a sealing device for preventing leakage from each part, a large heat exchanger for performing heat exchange between the cooling medium and the outside air, or the like is required, which leads to complexity of the device and an increase in cost. Therefore, in the present embodiment, as described above, the cooling member 25 having the fins 51 is adopted.

According to the above configuration, the heat of the electric motor 21 is dissipated to the outside (that is, the atmosphere) via the fins 51 of the cooling member 25. In other words, the temperature of the fin 51 itself is lowered due to the heat exchange between the heat transmitted to the fin 51 through the housing 34 and the outside air. Therefore, the heat of the electric motor 21 is less likely to be retained inside the electric motor 21. As a result, the electric motor 21 can be efficiently cooled.

Further, according to the above configuration, each fin 51 extends in the direction of the axis line O. Here, the flow direction of the air that is pressure-fed by the blade 42 provided on the upstream side of the fin 51 is inclined with respect to the axis line O (has a turning angle). The flow having the turning angle flows into a space between the fins 51 extending in the direction of the axis line O, so that the flow direction of the air is rectified in the direction of the axis line O. That is, the air is rectified toward a thrust direction (thrust force direction) of the electric fan 20. In this way, the thrust force of the electric fan 20 can be further increased while cooling the electric motor 21.

In particular, according to the above configuration, it is not necessary to supply a cooling medium from the outside in order to cool the electric motor 21 or to provide a sealing member or the like for preventing a leakage of the cooling medium. In this way, it is possible to provide the electric fan 20 having higher cooling performance under a further simplified structure.

The first embodiment of the present disclosure has been described above. Various changes and modifications can be made to the above configuration without departing from the scope of the present disclosure.

Second Embodiment

Next, a second embodiment of the present disclosure will be described with reference to FIGS. 5 and 6. In addition, the same configurations as in the first embodiment described above are denoted by the same reference signs, and detailed descriptions thereof will be omitted.

Figure 5:
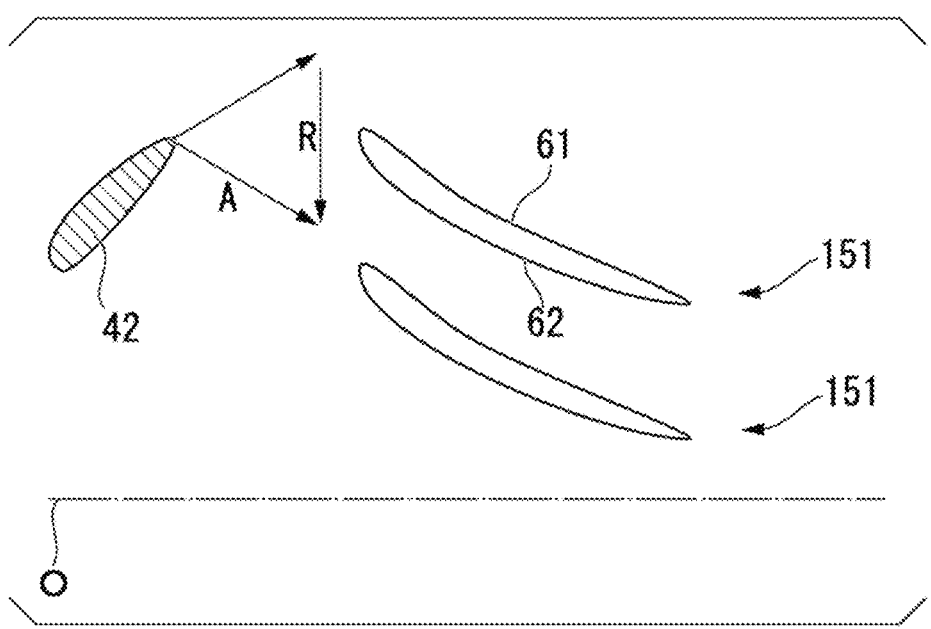
FIG. 5 is a diagram showing a cooling member and a blade according to a second embodiment of the present disclosure as viewed from the radial outer side.

As shown in FIG. 5, in the present embodiment, the extending direction and the shape of a fin 151 are different from those in the first embodiment. Specifically, the fin 151 has an airfoil-shaped cross-sectional shape when viewed in the radial direction. In the fin 151, a surface facing a rear side in the rotation direction (arrow R in FIG. 5) of the blade 42 is defined as a pressure side surface 61, and a surface facing a front side in the rotation direction of the blade 42 is defined as a suction side surface 62. The pressure side surface 61 is recessed in a curved surface shape toward the front side in the rotation direction. The suction side surface 62 is curved in a curved surface shape to be convex toward the front side in the rotation direction. In addition, an end portion on the upstream side of the fin 151 has an arc shape. On the other hand, an end portion on the downstream side of the fin 151 has a pointed shape.

As described above, since the fin 151 has an airfoil-shaped cross-sectional shape, in a flow path that is formed between a pair of fins 151 adjacent to each other, the flow path cross-sectional area is once reduced and then increased again as the flow path extends from the upstream side toward the downstream side.

Further, the end portion on the upstream side of the fin 151 extends toward the upstream side of the flow direction (arrow A) of the air that is pressure-fed by the blade 42. That is, a region on the upstream side of the flow path that is formed between the fins 151 extends substantially parallel to the flow direction of the air that is pressure-fed by the blade 42. On the other hand, the end portion on the downstream side of the fin 151 extends substantially parallel to the direction of the axis line O. That is, a region on the downstream side of the flow path that is formed between the fins 151 extends substantially parallel to the direction of the axis line O.

Figure 6:
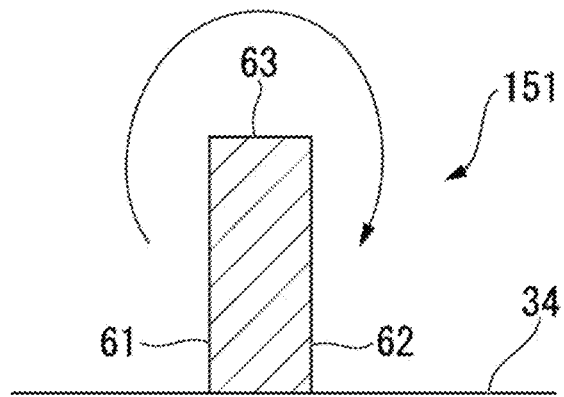
FIG. 6 is a cross-sectional view of a fin according to the second embodiment of the present disclosure, and is a diagram showing air flow around the fin.

In addition, as shown in FIG. 6, each fin 151 has a rectangular cross-sectional shape when viewed in the direction of the axis line O. That is, the dimensions in the circumferential direction of the fin 151 are constant in the entire region in the radial direction. In other words, the fin 151 has a thickness in the circumferential direction. Therefore, the fin 151 has a surface (an outer end surface 63) facing the radial outer side.

(Operation and Effect)

According to the above configuration, the end portion of the fin 151 on a first side in the direction of the axis line O extends toward the upstream side in the flow direction of the air that is pressure-fed by the blade 42. In this way, the flow of air is in a state of smoothly flowing along the surface of the blade 42. Therefore, it is possible to reduce the probability that the flow of the air is peeled off on the surface of the blade 42. In addition, since the peeling is less likely to occur, a probability that a vortex is generated between the fins 151 can also be reduced. As a result, it is possible to further improve the cooling performance of the electric motor 21.

Further, since the fin 151 has an airfoil-shaped cross-sectional shape, the interval between the fins 151 is once reduced and then increased again. In this way, a flow path between the fins 151 generates a diffuser effect. That is, since the flow velocity of the air decreases on the downstream side of the flow path between the fins 151, dynamic pressure decreases, so that static pressure can be recovered. In this way, it is possible to further reduce the probability that the peeling of the flow occurs on the surface of the fin 151.

In addition, according to the above configuration, since the fin 151 has the outer end surface 63 facing the radial outer side, a pressure difference is generated between both sides in a plate thickness direction of the fin 151 (that is, between the pressure side surface 61 and the suction side surface 62). A flow of air (vortex) that gets over the fin 151 from a high-pressure side to a low-pressure side is generated based on the pressure difference. Due to this flow, the high-temperature air near the root of the fin 151 flows toward the outer peripheral side. At this time, the high-temperature air is heat-exchanged with the low-temperature outside air on the outer peripheral side. Thereafter, the air that has been cooled by the heat exchange reaches the root of the fin 151 (that is, the surface of the housing 34) by getting over the fin 151. The low-temperature air in contact with the surface of the housing 34 takes heat from the housing 34 again. Such a phenomenon continuously occurs over the entire region in the circumferential direction. As a result, the cooling effect of the electric motor 21 by the fins 151 can be further enhanced.

The second embodiment of the present disclosure has been described above. Various changes and modifications can be made to the above configuration without departing from the scope of the present disclosure.

Third Embodiment

Figure 7:
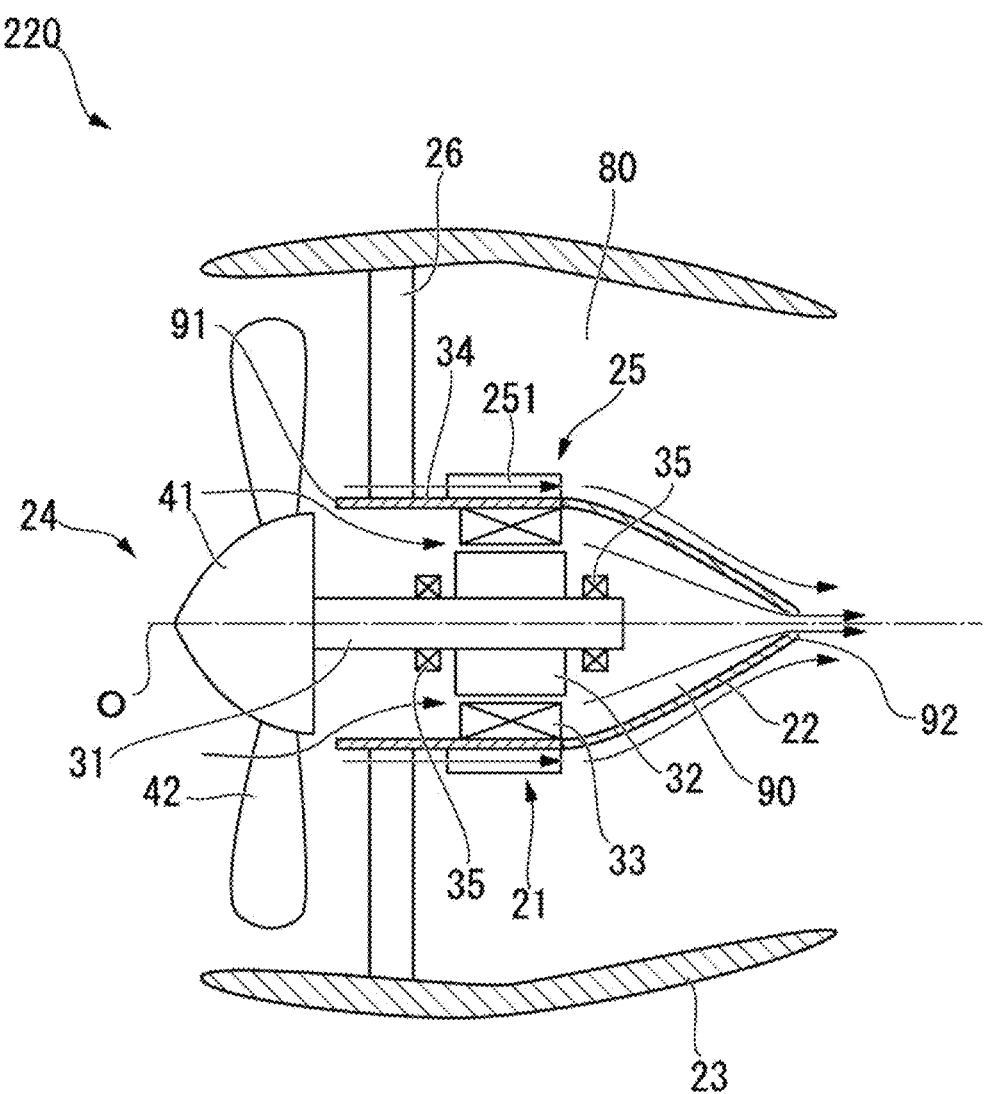
FIG. 7 is a cross-sectional view showing the configuration of an electric fan according to a third embodiment of the present disclosure.

Subsequently, a third embodiment of the present disclosure will be described with reference to FIGS. 7 to 9. In addition, the same configurations as those in each embodiment described above are denoted by the same reference signs, and detailed descriptions thereof will be omitted.

In an electric fan 220 according to the present embodiment, the shape of a fin 251 is different, and an internal cooling flow path 90 is formed inside the electric motor 21 and the inner duct 22. As shown in FIG. 7, in the electric fan 220, an annular gap expanding in the radial direction is formed between an end portion on the upstream side of the housing 34 of the electric motor 21 and the blade 42. This gap serves as an intake port 91 of air. Further, an exhaust port 92 for discharging air to the outside is formed at an end portion on the downstream side of the inner duct 22.

Part of the air pressure-fed by the blade 42 flows into the inside of the housing 34 of the electric motor 21 through the intake port 91. The air that has flowed into the housing 34 mainly flows toward the downstream side through a gap between the rotor core 32 and the stator core 33. At this time, the heat of the electric motor 21 is transmitted to the air. That is, the electric motor 21 is cooled. Thereafter, the air flows through the inner duct 22 and is discharged to the outside from the exhaust port 92. As described above, the internal cooling flow path 90 is formed by a flow path through which the air flows from the intake port 91 to the exhaust port 92.

Figure 8:
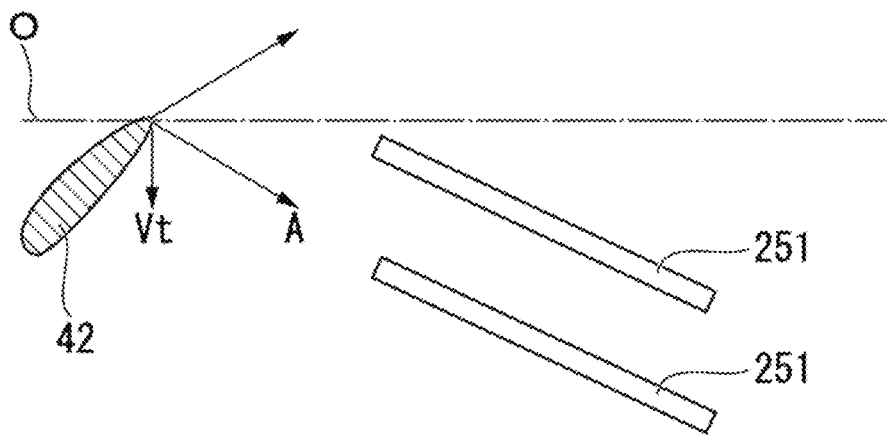
FIG. 8 is a diagram showing a cooling member and a blade according to the third embodiment of the present disclosure as viewed from the radial outer side.
Figure 9:
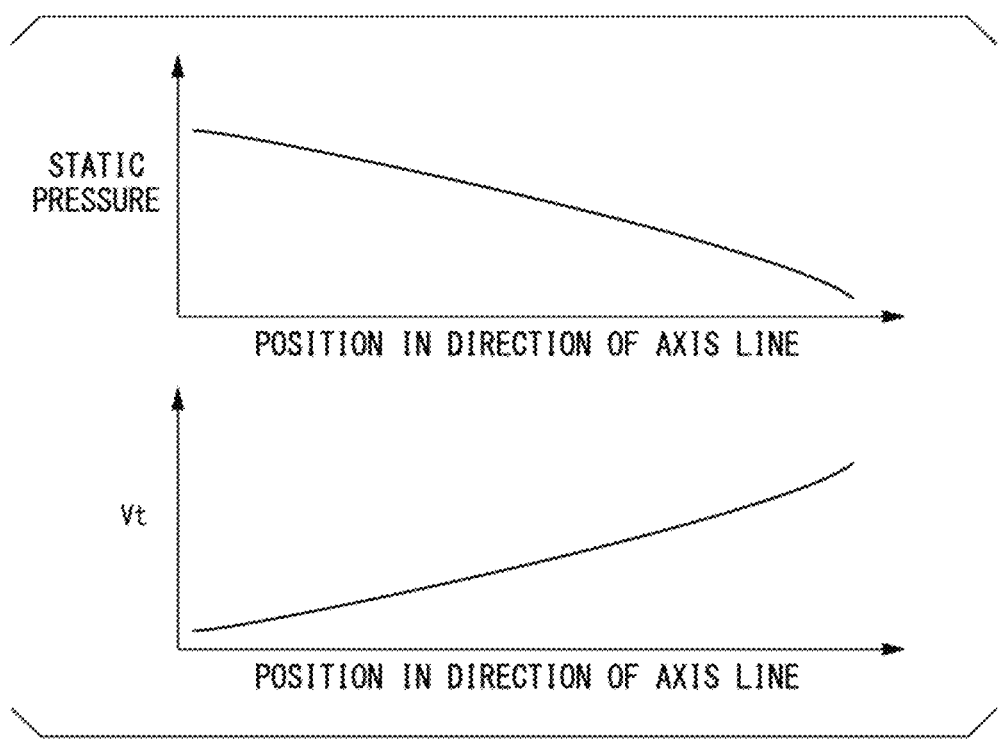
FIG. 9 is a graph showing the relationship between the position in the direction of the axis line on the outer surface of the electric fan according to the third embodiment of the present disclosure, the circumferential direction velocity of air flow, and the static pressure.

Further, as shown in FIG. 8, the fin 251 extends from the rear side in the rotation direction of the blade 42 toward the front side in the rotation direction of the blade 42, while extending toward a second side (downstream side) in the direction of the axis line O from a first side (upstream side) in the direction of the axis line O. In other words, the fin 251 is inclined with respect to the direction of the axis line O when viewed in the radial direction. In addition, the fin 251 extends linearly in the inclined direction. That is, an angle formed by the fin 251 with respect to the axis line O is constant over the entire region of the extension length of the fin 251.

(Operation and Effect)

According to the above configuration, since the fin 251 is inclined with respect to the rotation direction of the blade 42 and the direction of the axis line O, a state is created where a circumferential direction component (arrow Vt in FIG. 8) is included in the flow of air (arrow A in FIG. 8) that has passed through the flow path between the fins 251. In other words, the flow of air flows toward the downstream side while spirally turning around centered on the axis line O.

Here, as described above, the outer peripheral surface of the inner duct 22 is reduced in diameter toward the second side (downstream side) in the direction of the axis line O. Therefore, as shown in the graph of FIG. 9, the circumferential direction component of the velocity of the air flowing on the outer peripheral surface of the inner duct 22 gradually increases toward the second side (downstream side) in the direction of the axis line O, based on the law of conservation of angular momentum. As a result, as shown in the graph of FIG. 9, the dynamic pressure increases and the static pressure decreases around the exhaust port 92. That is, the static pressure around the exhaust port 92 becomes lower than the static pressure around the intake port 91. In this way, it is possible to smoothly form the flow of the air from the intake port 91 through the inside of the electric motor 21 (the internal cooling flow path 90) toward the exhaust port 92. As a result, it is possible to achieve both the cooling effect by the fins 251 and the cooling effect by the internal cooling flow path 90. Therefore, it is possible to further efficiently cool the electric motor 21.

The third embodiment of the present disclosure has been described above. Various changes and modifications can be made to the above configuration without departing from the scope of the present disclosure.

<Modification Examples Common to Each Embodiment>

Next, modification examples common to each embodiment will be described with reference to FIGS. 10 to 13.

Figure 10:
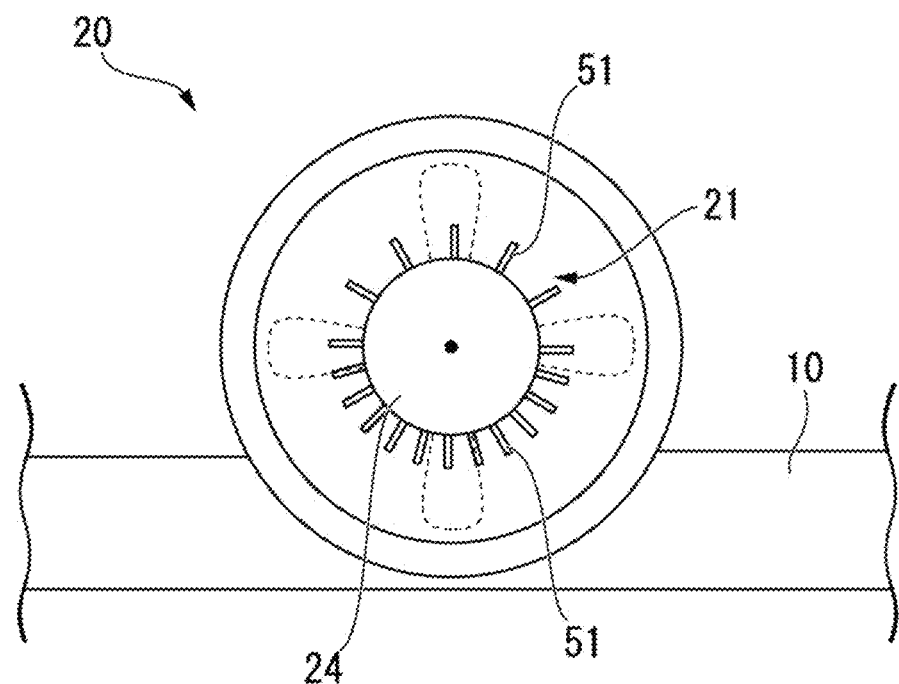
FIG. 10 is a diagram showing a modification example of the electric fan common to each embodiment of the present disclosure, and is a diagram showing the electric fan and a fuselage as viewed in the direction of the axis line.

In each of the embodiments described above, the example has been described in which the fins 51 of the cooling member 25 are arranged at equal intervals in the circumferential direction. However, as shown in FIG. 10, a configuration can be adopted in which the interval between the fins 51 is narrower in a region of a part in the circumferential direction than that in the other region. More specifically, in the example of FIG. 10, the interval between the fins 51 in the circumferential direction of the electric fan 20 is made narrower in a region close to the fuselage 10 in the circumferential direction.

Here, since the flow velocity of the air that is taken into the electric fan 20 is hindered by the fuselage 10, the flow velocity tends to become particularly low in a part in the circumferential direction which is in contact with the fuselage 10. According to the above configuration, in this manner, the interval between the fins 51 is made narrow in a region where the flow velocity is low. In this way, the cooling performance can be supplemented by a large number of the fins 51 even in a region where the flow velocity is low. As a result, it is possible to eliminate unevenness of cooling performance in the circumferential direction.

Figure 11:
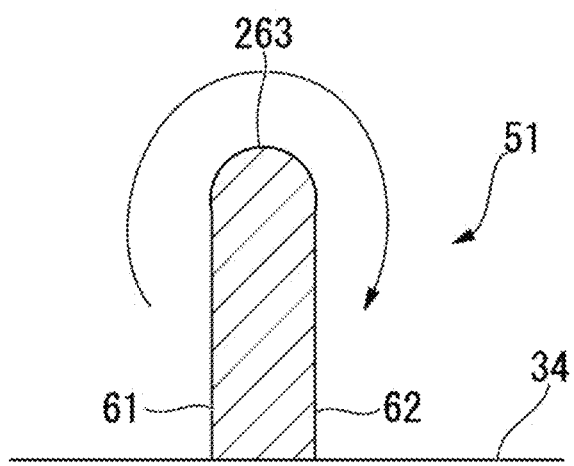
FIG. 11 is a cross-sectional view showing a first modification example of the fin common to each embodiment of the present disclosure.

Further, in each of the embodiments described above, the example has been described in which the fin 51 has a rectangular cross-sectional shape when viewed in the direction of the axis line O. That is, the example has been described in which the outer end surface 63 having a flat shape is formed on the radial outer side of the fin 51. However, as shown in FIG. 11, an outer end surface 263 may have an arc shape to be convex toward the radial outer side. According to this configuration, as described in the second embodiment, the vortex that is formed on an outer end surface 263 of the fin 51 can be further grown. In this way, it is possible to further enhance the cooling effect by the fin 51.

Figure 12:
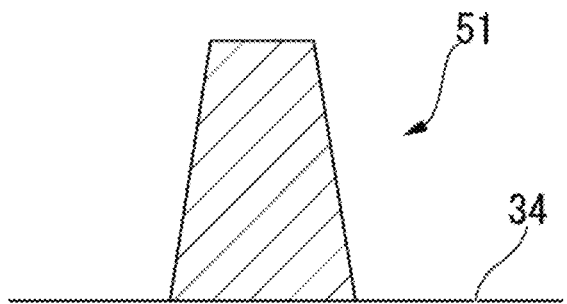
FIG. 12 is a cross-sectional view showing a second modification example of the fin common to each embodiment of the present disclosure.
Figure 13:
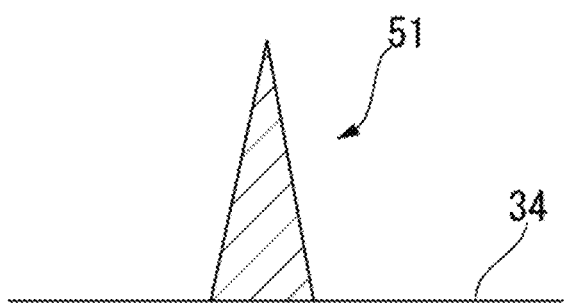
FIG. 13 is a cross-sectional view showing a third modification example of the fin common to each embodiment of the present disclosure.

In addition, the cross-sectional shape of the fin 51 is not limited to the shapes described above, and a shape shown in FIG. 12 or FIG. 13 can be adopted. In the example of FIG. 12, the fin 51 has an isosceles trapezoidal cross-sectional shape. In the example of FIG. 13, the fin 51 has an isosceles triangular cross-sectional shape. In addition, although not shown in the drawing, the fin 51 may have a scalene triangular cross-sectional shape.

<Additional Remark>

The electric fan 20 and the electric aircraft 1 described in each embodiment are understood, for example, as follows.

(1) The electric fan 20 according to a first aspect includes: the electric motor 21 that includes the output shaft 31 extending along the axis line O and the tubular housing 34 centered on the axis line O; the inner duct 22 provided on the downstream side of the electric motor 21; the plurality of blades 42 mounted on the output shaft 31; and the cooling member 25 having the plurality of fins 51 provided on the outer peripheral surface of the housing 34.

According to the above configuration, the heat of the electric motor 21 is dissipated to the outside through the fins 51 of the cooling member 25. In this way, the electric motor 21 can be efficiently cooled.

(2) In the electric fan 20 according to a second aspect, in the electric fan 20 according to the first aspect, the plurality of fins 51 may protrude to the radial outer side with respect to the axis line O, extend in the direction of the axis line O, and be arranged at intervals in the circumferential direction.

According to the above configuration, since the fin 51 extends in the direction of the axis line O, the flow of the air that is pressure-fed by the blade 42 is rectified in the direction of the axis line O. In this way, the thrust force of the electric fan 20 can be further increased while cooling the electric motor 21.

(3) In the electric fan 20 according to a third aspect, in the electric fan 20 according to the first or second aspect, an end portion of the fin 51 on a first side in the direction of the axis line O may extend toward the upstream side in the flow direction of the air that is pressure-fed by the blade 42, an end portion of the fin 51 on a second side in the direction of the axis line O may extend in the direction of the axis line O, and the fin 51 may have an airfoil-shaped cross-sectional shape in which when viewed in the radial direction, a rear side in the rotation direction of the blade 42 is defined as the pressure side surface 61 and a front side in the rotation direction of the blade 42 is defined as the suction side surface 62.

According to the above configuration, since the end portion of the fin 51 on a first side in the direction of the axis line O extends toward the upstream side in the flow direction of the air that is pressure-fed by the blade 42, a probability that the flow of the air is peeled off from the surface of the fin 51 can be reduced. Further, since the fin 51 has an airfoil-shaped cross-sectional shape, the interval between the fins 51 is once reduced and then increased again. In this way, it is possible to recover the static pressure on the downstream side. In this way, it is possible to further reduce the probability that the peeling occurs on the surface of the fin 51.

(4) In the electric fan 20 according to a fourth aspect, in the electric fan 20 according to any one of the first to third aspects, the inner duct 22 may be gradually reduced in diameter from a first side in the direction of the axis line O toward a second side in the direction of the axis line O, the intake port 91 through which the air pressure-fed by the blade 42 is taken in toward the electric motor 21 may be formed in the housing 34, the exhaust port 92 fort discharging the air that has flowed through the intake port 91 may be formed in an end portion of the inner duct 22 on the second side in the direction of the axis line O, and the fin 51 may extend from the rear side in the rotation direction of the blade 42 toward the front side in the rotation direction of the blade 42, while extending toward the second side in the direction of the axis line O from the first side in the direction of the axis line O.

According to the above configuration, since the fin 51 is inclined with respect to the rotation direction of the blade 42, a state is created in which the circumferential direction component is included in the air that has passed through the fin 51. Further, since the inner duct 22 is reduced in diameter toward the second side in the direction of the axis line O, the circumferential direction component of the velocity of the air flowing on the outer peripheral surface of the inner duct 22 gradually increases toward the second side in the direction of the axis line O. As a result, the static pressure around the exhaust port 92 becomes lower than the static pressure around the intake port 91. In this way, it is possible to form the flow of the air from the intake port 91 through the inside of the electric motor 21 toward the exhaust port 92. As a result, it is possible to more efficiently cool the electric motor 21.

(5) In the electric fan 20 according to a fifth aspect, in the electric fan 20 according to any one of the first to fourth aspects, the fin 51 may have the outer end surface 63 facing the radial outer side.

According to the above configuration, since the fin 51 has the outer end surface 63 facing the radial outer side, a pressure difference is generated between both sides in the plate thickness direction of the fin 51. Flow of air (vortex) that gets over the fin 51 from the high-pressure side to the low-pressure side is generated based on the pressure difference. Due to this flow, the high-temperature air near the root of the fin 51 is heat-exchanged with the low-temperature outside air on the outer peripheral side. As a result, the cooling effect by the fin 51 can be further enhanced.

(6) In the electric fan 20 according to a sixth aspect, in the electric fan 20 according to the fifth aspect, the outer end surface 63 may have an arc shape to be convex toward the radial outer side.

According to the above configuration, the vortex that is formed on the outer end surface 63 of the fin 51 can be further grown. In this way, it is possible to further enhance the cooling effect by the fin 51.

(7) The electric aircraft 1 according to a seventh aspect includes: the electric fan 20 according to any one of the first to sixth aspects; and the fuselage 10 on which the electric fan 20 is mounted.

According to the above configuration, since the electric fan 20 has high cooling performance, it is possible to extend the cruising performance or the life cycle of the electric aircraft 1.

(8) In the electric aircraft 1 according to an eighth aspect, in the electric aircraft 1 according to the seventh aspect, the interval between the fins 51 may be made narrower in a region of a part in the circumferential direction of the electric fan 20 which is in contact with the fuselage 10 than in an other region.

Here, the flow velocity of the air that is taken into the electric fan 20 tends to become particularly low in a part in the circumferential direction which is in contact with the fuselage 10. According to the above configuration, in this manner, the interval between the fins 51 is made narrow in a region where the flow velocity is low. In this way, it is possible to eliminate unevenness of cooling performance in the circumferential direction.

INDUSTRIAL APPLICABILITY

According to the present disclosure, it is possible to provide an electric fan and an electric aircraft, which have a simpler structure and have higher cooling performance.

REFERENCE SIGNS LIST

1: Electric aircraft
10: Fuselage
11: Fuselage main body
12: Wing
20: Electric fan
21: Electric motor
22: Inner duct
23: Outer duct
24: Propeller
25: Cooling member
26: Strut
31: Output shaft
32: Rotor core
33: Stator core
34: Housing
35: Bearing device
41: Spinner
42: Blade
51: Fin
61: Pressure side surface
62: Suction side surface
63: Outer end surface
80: Air flow path
90: Internal cooling flow path
91: Intake port
92: Exhaust port
151: Fin
220: Electric fan
251: Fin
263: Outer end surface
O: Axis line

What is claimed is:
1. An electric fan comprising:
an electric motor that includes an output shaft extending along an axis line and a tubular housing centered on the axis line;

an inner duct provided on a downstream side of the electric motor;
a plurality of blades mounted on the output shaft; and
a cooling member having a plurality of fins provided on an outer peripheral surface of the housing,
wherein the inner duct is gradually reduced in diameter from a first side in a direction of the axis line toward a second side in the direction of the axis line,
an intake port through which air pressure-fed by the blade is taken in toward the electric motor is formed in the housing,
an exhaust port for discharging air that has flowed through the intake port is formed in an end portion of the inner duct on the second side in the direction of the axis line,
the fin extends from a rear side in a rotation direction of the blade toward a front side in the rotation direction of the blade, while extending toward the second side in the direction of the axis line from the first side in the direction of the axis line, and
an interval between the plurality of fins in a circumferential direction of the electric fan is made narrower close to a fuselage in the circumferential direction.

2. The electric fan according to claim 1,
wherein the plurality of fins protrude to a radial outer side with respect to the axis line, extend in a direction of the axis line, and are arranged at intervals in the circumferential direction.

3. The electric fan according to claim 2,
wherein the fin has an outer end surface facing a radial outer side.

4. The electric fan according to claim 1,
wherein an end portion of the fin on a first side in the direction of the axis line extends toward an upstream side in a flow direction of air that is pressure-fed by the blade,
an end portion of the fin on a second side in the direction of the axis line extends in the direction of the axis line, and
the fin has an airfoil-shaped cross-sectional shape in which when viewed in a radial direction, the rear side in the rotation direction of the blade is defined as a pressure side surface and the front side in the rotation direction of the blade is defined as a suction side surface.

5. The electric fan according to claim 4,
wherein the fin has an outer end surface facing a radial outer side.

6. The electric fan according to claim 1,
wherein the fin has an outer end surface facing a radial outer side.

7. The electric fan according to claim 6,
wherein the outer end surface has an arc shape to be convex toward the radial outer side.

8. An electric aircraft comprising:
the electric fan according to claim 1; and
the fuselage on which the electric fan is mounted.

9. The electric aircraft according to claim 8,
wherein an interval between the fins is made narrower in a region of a part in a circumferential direction of the electric fan which is in contact with the fuselage than in an other region.

* * * * *